United States Patent
Kotani et al.

(10) Patent No.: US 8,015,834 B2
(45) Date of Patent: Sep. 13, 2011

(54) ROTATION SPEED CONTROL DEVICE, AIR CONDITIONER, AND ROTATION SPEED CONTROL METHOD

(75) Inventors: Takuya Kotani, Izumi (JP); Kikuji Hori, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 491 days.

(21) Appl. No.: 12/162,796

(22) PCT Filed: Feb. 13, 2007

(86) PCT No.: PCT/JP2007/052459
§ 371 (c)(1),
(2), (4) Date: Jul. 31, 2008

(87) PCT Pub. No.: WO2007/094283
PCT Pub. Date: Aug. 23, 2007

(65) Prior Publication Data
US 2009/0007577 A1  Jan. 8, 2009

(30) Foreign Application Priority Data

Feb. 17, 2006 (JP) .................................. 2006-041211

(51) Int. Cl.
*F25D 17/00* (2006.01)
*F25B 39/04* (2006.01)
(52) U.S. Cl. .................. 62/181; 62/177; 62/180; 62/183
(58) Field of Classification Search .................... 62/177, 62/180, 181, 183, 222, 223
See application file for complete search history.

(56) References Cited

U.S. PATENT DOCUMENTS

| | | | | |
|---|---|---|---|---|
| 4,909,041 A | * | 3/1990 | Jones | 62/99 |
| 5,168,715 A | * | 12/1992 | Nakao et al. | 62/181 |
| 5,257,508 A | * | 11/1993 | Powell et al. | 62/180 |
| 5,568,732 A | * | 10/1996 | Isshiki et al. | 62/129 |

FOREIGN PATENT DOCUMENTS

| | | | |
|---|---|---|---|
| JP | 57-062348 A | | 4/1982 |
| JP | 01-291044 A | | 11/1989 |
| JP | 2002-031395 A | | 1/2002 |
| JP | 2002-039589 A | | 2/2002 |
| JP | 2002-039602 A | | 2/2002 |
| JP | 2002039602 A | * | 2/2002 |

* cited by examiner

*Primary Examiner* — Chen Wen Jiang
(74) *Attorney, Agent, or Firm* — Global IP Counselors

(57) ABSTRACT

An outdoor control unit includes a first control unit, a second control unit, and a switching unit. The outdoor control unit controls the rotational speed of an outdoor fan. The first control unit executes a first control for controlling the rotational speed of the outdoor fan based on the operation frequency of the compressor. The second control unit executes a second control for controlling the rotational speed of the outdoor fan based on a parameter other than the operation frequency of the compressor. The switching unit executes a switching control for switching between the first control and the second control according to a predetermined switching condition, when a cooling mode is being operated under a low outside air condition. The low outside air condition refers to a state that the outside air temperature is lower than a first temperature.

19 Claims, 4 Drawing Sheets

| Operating state of compressor | | | Minimum value of the step number of the outdoor fan |
|---|---|---|---|
| Operation frequency of inverter compressor | Fixed capacity compressor 1 | Fixed capacity compressor 2 | |
| 52 Hz or lower | Off | Off | 3 |
| 74 Hz or lower | Off | Off | 4 |
| 96 Hz or lower | Off | Off | 4 |
| 124 Hz or lower | Off | Off | 5 |
| 158 Hz or lower | Off | Off | 5 |
| 176 Hz or lower | On | Off | 6 |
| 176 Hz or lower | Off | Off | 5 |
| 176 Hz or lower | On | On | 6 |

FIG. 4

ROTATION SPEED CONTROL DEVICE, AIR CONDITIONER, AND ROTATION SPEED CONTROL METHOD

CROSS-REFERENCE TO RELATED APPLICATIONS

This U.S. National stage application claims priority under 35 U.S.C. §119(a) to Japanese Patent Application No. 2006-041211, filed in Japan on Feb. 17, 2006, the entire contents of which are hereby incorporated herein by reference.

TECHNICAL FIELD

The present invention relates to a rotation speed control device for controlling the rotational speed of an outdoor fan, an air conditioner including a rotation speed control unit for controlling the rotational speed of an outdoor fan, and a rotation speed control method for controlling the rotational speed of an outdoor fan.

BACKGROUND ART

Among the air conditioners arranged in office buildings and general residential buildings, and the like, split-type systems having an indoor unit and an outdoor unit are widely used. In this kind of an air conditioner, a refrigerant circuit is often times formed by a compressor and an outdoor heat exchanger included in the outdoor unit, an expansion valve and an indoor heat exchanger included in the indoor unit, and a refrigerant communication pipe for connecting these equipments. Heat exchange can be done at the outdoor heat exchanger and the indoor heat exchanger, through refrigerant circulating through this kind of a refrigerant circuit. In addition, normally in this kind of an outdoor unit, an outdoor fan is arranged for encouraging heat exchange in the outdoor heat exchanger.

In the case that cooling operation is performed under a condition that the temperature of outside air is comparatively low during a time such as between seasons, if the outdoor fan rotates excessively, there might be a problem that there will not be a sufficient differential pressure between the pressure of the refrigerant on the intake side and the pressure of the refrigerant on the discharging side of the compressor. In this kind of a situation, problems such as the reverse rotation of the compressor, circulating amount dropping can occur, and this lowers the reliability of the compressor.

Consequently, as described in JP-A Publication No. 2002-39589, conventionally, if the differential pressure between the high and low pressure of a compressor cannot be kept sufficiently, a control for lowering the rotational speed of the outdoor fan is performed. More specifically, in Patent Document 1, a maximum value for the rotational speed of the outdoor fan is set according to the state of the differential pressure between the high and low pressure of the compressor.

SUMMARY OF THE INVENTION

Problem to be Solved by the Invention

Meanwhile, an outdoor unit of an air conditioner is often installed on the roof of an office building, within the property of a general residential building or the like. For this reason, the operating sound of the compressor that is arranged inside the casing of the outdoor unit can cause undesirable noises. In particular, the operating sound occurred during the operation frequency of a variable capacity compressor that is driven by a motor controlled by an inverter or the like is rising may be quite unpleasant to those who can hear the sound.

It is an object of the present invention to reduce the discomfort that is caused by the operating sound of the compressor when the operation frequency thereof is rising, in an air conditioner.

Means of Achieving the Object

The rotation speed control device in accordance with a first aspect of the present invention is a rotation speed control device for controlling the rotational speed of an outdoor fan, and includes a first control unit, a second control unit, and a switching unit. This outdoor fan is a fan for sending air to an outdoor heat exchanger in order to encourage heat exchange at the outdoor heat exchanger that is included in the refrigerant circuit. The first control unit executes a first control for controlling the rotational speed of the outdoor fan base on the operation frequency of a compressor included in the refrigerant circuit. The second control unit executes a second control for controlling the rotational speed of the outdoor fan based on a parameter other than the operation frequency of the compressor. The switching unit executes a switching control for switching between the first control and the second control according to a predetermined switching condition, when a cooling mode is being operated under a low outside air condition. The low outside air condition refers to a state that the outside air temperature is lower than a first temperature.

As described above, conventionally, the rotational speed of the outdoor fan that is provided in an outdoor unit of an air conditioner is controlled based on the state of the differential pressure between the high and low pressure of the compressor that is provided in the same outdoor unit. In this case, when operating in a cooling mode under the low outside air condition, it is controlled in a way so that the rotation of the outdoor fan is being hindered in order to secure the differential pressure between the high and low pressure of the compressor, by setting a maximum value to the rotational speed of the outdoor fan, and so forth.

Meanwhile, with the rotation speed control device of the first aspect, the rotational speed of the outdoor fan for sending air toward the outdoor heat exchanger included in the refrigerant circuit is being controlled. Furthermore, when a cooling mode is operated under the low outside air condition, the rotational speed of the outdoor fan is controlled by either the first control unit for executing the first control or the second control unit for executing a second control. The rotational speed of the outdoor fan is controlled based on the operation frequency of the compressor if the first control is executed, and controlled based on a parameter other than the operation frequency of the compressor if the second control is executed. In other words, during the time that the first control is executed during an operation in the cooling mode under the low outside air condition, the rotation of the outdoor fan is not being hindered according to the state of the differential pressure between the high and low pressure of the compressor, but is allowed according to the state of the operation frequency of the compressor. Therefore, unpleasant sound that occurs when the operation frequency of the compressor is rising at a time when activating and so forth is drown out by the rotating sound of the outdoor fan. As a result, with this rotation speed control device, it is possible to suppress the unpleasant feeling that is resulted from the operating sound when the operation frequency of the compressor is rising.

The rotation speed control device in accordance with a second aspect of the present invention is the rotation speed control device of the first aspect, wherein the parameter used in the second control is the pressure of the discharging side of the compressor or the temperature of the outdoor heat exchanger.

With this rotation speed control device, during the second control, the rotational speed of the outdoor fan is controlled based on the pressure of the discharging side of the compressor, or based on the temperature of the outdoor heat exchanger, which can be converted to the pressure of the discharging side of the compressor, and has a certain relationship with the pressure of the discharging side of the compressor. In other words, during the time that the second control is executed when operating in the cooling mode under the low outside air condition, securing the differential pressure between the high and low pressure of the compressor is given priority. In this manner, with this rotation speed control device, by using in combination a control (first control) in which the rotation of the outdoor fan is given priority, and a control (second control) in which securing the differential pressure between the high and low pressure of the compressor is given priority, while the differential pressure between the high and low pressure of the compressor is secured, unpleasant feeling resulted from the operating sound when the operation frequency of the compressor is rising can be suppressed.

The rotation speed control device in accordance with a third aspect of the present invention is the rotation speed control device of the second aspect, wherein the switching unit switches the first control to the second control if the differential pressure between the high and low pressure of the compressor is below a predetermined standard value during the time that the first control is being executed.

With this rotation speed control device, when the differential pressure between the high and low pressure of the compressor is below a predetermined standard value during the time that a control (first control) in which the rotation of the outdoor fan is given priority is executed, it is switched, from this first control, to a control (second control) in which securing the differential pressure between the high and low pressure of the compressor is given priority. As a result, with this rotation speed control device, the differential pressure between the high and low pressure of the compressor can be secured.

The rotation speed control device in accordance with a fourth aspect of the present invention is the rotation speed control device of the second aspect or the third aspect, wherein the switching unit switches the first control to the second control if the outside air temperature is below a second temperature that is lower than the first temperature, during the time that the first control is executed.

For example, in an environment in which crowds of people are concentrated like in a department store and so forth, sometimes it is still necessary for the system to operate in the cooling mode even in the winter. When the system is operated in the cooling mode under an environment in which the outside air temperature is considerably low in this way, it becomes difficult to secure the differential pressure between the high and low pressure of the compressor despite the rotational status of the outdoor fan. With the rotation speed control device of the fourth aspect, if the outside air temperature is lower than a temperature (second temperature) that is lower than the first temperature when the control (first control) in which the rotation of the outdoor fan is given priority is being executed, it is switched, from this first control, to the control (second control) in which securing the differential pressure between the high and low pressure of the compressor is given priority. By doing so, with this rotation speed control device, it is possible to secure the differential pressure between the high and low pressure of the compressor.

The rotation speed control device in accordance with a fifth aspect of the present invention is the rotation speed control device of any of the first aspect to the fourth aspect, wherein a memory unit is further included. The memory unit stores correspondence information for correlating the operation frequency of the compressor and the rotational speed of the outdoor fan. Furthermore, the first control unit refers to the correspondence information that is stored in the memory unit to control the rotational speed of the outdoor fan in the first control.

With this rotation speed control device, correspondence information for correlating the operation frequency of the compressor and the rotational speed of the outdoor fan is set in advance, and this correspondence information is being referred to, in the case that the first control is being executed in which the rotational speed of the outdoor fan is controlled based on the operation frequency of the compressor. By doing so, with this rotation speed control device, the rotational speed of the outdoor fan can be controlled based on the operation frequency of the compressor.

The rotation speed control device in accordance with a sixth aspect of the present invention is the rotation speed control device of the fifth aspect, wherein the correspondence information includes information for setting a minimum value of the rotational speed of the outdoor fan, in relation to the operation frequency of the compressor.

With this rotation speed control device, a minimum value of the rotational speed of the outdoor fan in relation to the operation frequency of the compressor is set in advance. For this reason, during the time that the control (first control) in which the rotation of the outdoor fan is given priority is being executed, since the outdoor fan rotates at a rotational speed that is equal to or greater than this minimum value, a rotating sound with a certain magnitude or greater from the outdoor fan is generated. Therefore, with this rotation speed control device, the operating sound when the operation frequency of the compressor is rising can be drown out by the rotating sound of the outdoor fan that has at least a certain magnitude.

The rotation speed control device in accordance with a seventh aspect of the present invention is the rotation speed control device of any of the first aspect to the sixth aspect, wherein a selection receiving unit is further included. The selection receiving unit receives a selection to enable or disable the switching control.

With this rotation speed control device, a selection receiving unit for receiving a selection of whether to enable or disable the use of the first control and the second control in combination, in the control of the rotational speed of the outdoor fan, is provided. By doing so, with this rotation speed control device, a selection of whether to enable or disable the use of the first control and the second control in combination can be made according to the intention of the user.

The rotation speed control device in accordance with an eighth aspect of the present invention is the rotation speed control device of the seventh aspect, wherein the second control is executed and the first control is not executed if a selection is made to disable the switching control through the selection receiving unit.

With this rotation speed control device, if a selection is made to disable the use of the first control and the second control in combination through the selection receiving unit, the control (first control) in which the rotation of the outdoor fan is given priority is not executed. Depending on the installation environment of the outdoor unit, sometimes unpleasant sound from the compressor does not cause a problem, for example, in such a situation, by making a selection to disable the use of the first control and the second control in combination, the rotational speed of the outdoor fan can be controlled without putting the priority on a measure for the unpleasant sound generated from the compressor.

The air conditioner in accordance with a ninth aspect of the present invention includes a refrigerant circuit, an outdoor fan, and a rotation speed control unit. The refrigerant circuit includes a compressor, outdoor heat exchanger, expansion valves, and indoor heat exchanger. The outdoor fan is a fan for sending air to the outdoor heat exchanger in order to encourage heat exchange at the outdoor heat exchanger. The rotation speed control unit controls the rotational speed of the outdoor fan. The rotation speed control unit includes a first control unit, a second control unit, and a switching unit. The first control unit executes a first control for controlling the rotational speed of the outdoor fan based on the operation frequency of the compressor. The second control unit executes a second control for controlling the rotational speed of the outdoor fan based on a parameter other than the operation frequency of the compressor. The switching unit executes a switching control for switching between the first control and the second control according to a predetermined switching condition, when the system is operated in the cooling mode under a low outside air condition. The low outside air condition refers to a state that the outside air temperature is lower than a first temperature.

With this air conditioner, the rotational speed of the outdoor fan for sending air toward the outdoor heat exchanger included in the refrigerant circuit is controlled. Furthermore, the rotational speed of the outdoor fan is controlled by either the first control unit for executing the first control or by the second control unit for executing the second control, when the system is operated in the cooling mode under the low outside air condition. The rotational speed of the outdoor fan is controlled based on the operation frequency of the compressor if the first control is executed, and controlled based on a parameter other than the operation frequency of the compressor if the second control is executed. In other words, during the time that the first control is executed when the system is operated in the cooling mode under the low outside air condition, the rotation of the outdoor fan is not hindered according to the state of the differential pressure between the high and low pressure of the compressor, but is allowed according to the state of the operation frequency of the compressor. Therefore, unpleasant sound generated when the operation frequency of the compressor is rising at a time when activating and so forth is drown out by the rotating sound of the outdoor fan. As a result, with this air conditioner, unpleasant feeling resulted from the operating sound when the operation frequency of the compressor is rising can be suppressed.

The rotation speed control method in accordance with a tenth aspect of the present invention is a rotation speed control method for controlling the rotational speed of an outdoor fan, and includes controlling in a first control, controlling in a second control, and switching. The outdoor fan is a fan for sending air to the outdoor heat exchanger in order to encourage heat exchange at the outdoor heat exchanger included in the refrigerant circuit. In the first control, the rotational speed of the outdoor fan is controlled based on the operation frequency of the compressor included in the refrigerant circuit. In the second control, the rotational speed of the outdoor fan is controlled based on a parameter other than the operation frequency of the compressor. The control is switched between the first control and the second control according to a predetermined switching condition, during the time that a cooling mode is being operated under a low outside air condition. The low outside air condition refers to a state that the outside air temperature is lower than a first temperature.

With this rotation speed control method, the rotational speed of the outdoor fan for sending air toward the outdoor heat exchanger included in the refrigerant circuit is controlled. Furthermore, the rotational speed of the outdoor fan is controlled by the execution of the first control or the second control, when the system is operated in the cooling mode under the low outside air condition. The rotational speed of the outdoor fan is controlled based on the operation frequency of the compressor if the first control is executed, and controlled based on a parameter other than the operation frequency of the compressor if the second control is executed. In other words, during the time that the first control is executed when the cooling mode is operated under the low outside air condition, the rotation of the outdoor fan is not hindered according to the state of the differential pressure between the high and low pressure of the compressor, but is allowed according to the state of the operation frequency of the compressor. Therefore, unpleasant sound generated when the operation frequency of the compressor is rising at a time when activating and so forth is drown out by the rotating sound of the outdoor fan. As a result, with this rotation speed control method, unpleasant feeling resulted from the operating sound when the operation frequency of the compressor is rising can be suppressed.

EFFECT OF THE INVENTION

With the rotation speed control device of the first aspect, during the time that the first control is executed when the system is operated in the cooling mode under the low outside air condition, the rotation of the outdoor fan is not hindered according to the state of the differential pressure between the high and low pressure of the compressor, but is allowed according to the state of the operation frequency of the compressor. Therefore, unpleasant sound generated when the operation frequency of the compressor is rising at a time when activating and so forth is drown out by the rotating sound of the outdoor fan. For this reason, with this rotation speed control device, unpleasant feeling resulted from the operating sound when the operation frequency of the compressor is rising can be suppressed.

With the rotation speed control device of the second aspect, a control (first control) in which the rotation of the outdoor fan is given priority and a control (second control) in which securing the differential pressure between the high and low pressure of the compressor is given priority are used in combination. For this reason, with this rotation speed control device, while the differential pressure between the high and low pressure of the compressor is being secured, unpleasant feeling resulted from the operating sound when the operation frequency of the compressor is rising can be suppressed.

With the rotation speed control device of the third aspect, if the differential pressure between the high and low pressure of the compressor is below a predetermined standard value when the first control is executed, it is switched from the first control to the second control. By doing so, with this rotation speed control device, it is possible to secure the differential pressure between the high and low pressure of the compressor.

With the rotation speed control device of the fourth aspect, if the outside air temperature is below a temperature (second temperature) that is lower than the first temperature when the first control is being executed, it is switched from this first control to the second control. As a result, with this rotation speed control device, it is possible to secure the differential pressure between the high and low pressure of the compressor.

With the rotation speed control device of the fifth aspect, correspondence information for correlating the operation frequency of the compressor and the rotational speed of the outdoor fan is set in advance, and this correspondence information is being referred to, if the first control is executed. By doing so, with this rotation speed control device, the rotational speed of the outdoor fan can be controlled based on the operation frequency of the compressor.

With the rotation speed control device of the sixth aspect, a minimum value of the rotational speed of the outdoor fan is set in advance in relation to the operation frequency of the compressor, and during the time that the first control is executed, since the outdoor fan rotates with a rotational speed that is equal to or greater than this minimum value, a rotating sound of a certain magnitude or greater is generated from the outdoor fan. As a result, with this rotation speed control device, the operating sound when the operation frequency of the compressor is rising can be drown out by the rotating sound of the outdoor fan, which is of a certain magnitude or greater.

With the rotation speed control device of the seventh aspect, a selection receiving unit is provided for receiving a selection of whether to enable or disable the use of the first control and the second control in combination, in the control of the rotational speed of the outdoor fan. For this reason, with this rotation speed control device, a selection of whether to enable or disable the use of the first control and the second control in combination can be made according to the intention of the user.

With the rotation speed control device of the eighth aspect, if a selection is made to disable the use of the first control and the second control in combination through the selection receiving unit, the first control is not executed. Consequently, if unpleasant sound from the compressor does not cause a problem, by selecting to disable the use of the first control and the second control in combination, the rotational speed of the outdoor fan can be controlled without putting a priority on a measure for the unpleasant sound generated from the compressor.

With the air conditioner of the ninth aspect, during the time that the first control is executed when the system is operated in the cooling mode under the low outside air condition, the rotation of the outdoor fan is not hindered according to the state of the differential pressure between the high and low pressure of the compressor, but is allowed according to the state of the operation frequency of the compressor. Therefore, unpleasant sound generated when the operation frequency of the compressor is rising at a time when actuating and so forth is drown out by the rotating sound of the outdoor fan. As a result, with this rotation speed control device, unpleasant feeling resulted from the operating sound when the operation frequency of the compressor is rising can be suppressed.

With the rotation speed control method of the tenth aspect, during the time that the first control is executed when the system is operated in the cooling mode under the low outside air condition, the rotation of the outdoor fan is not hindered according to the state of the differential pressure between the high and low pressure of the compressor, and is allowed according to the state of the operation frequency of the compressor. Therefore, unpleasant sound generated when the operation frequency of the compressor is rising at a time when actuating and so forth is drown out by the rotating sound of the outdoor fan. As a result, with this rotation speed control method, unpleasant feeling resulted from the operating sound when the operation frequency of the compressor is rising can be suppressed.

BRIEF DESCRIPTION OF THE DRAWINGS

FIG. 4 is a diagram showing minimum values of step numbers of the outdoor fan in relation to the operating state of a compressor.

DETAILED DESCRIPTION OF THE INVENTION

<Configuration of an Air Conditioner>

Figure 1:
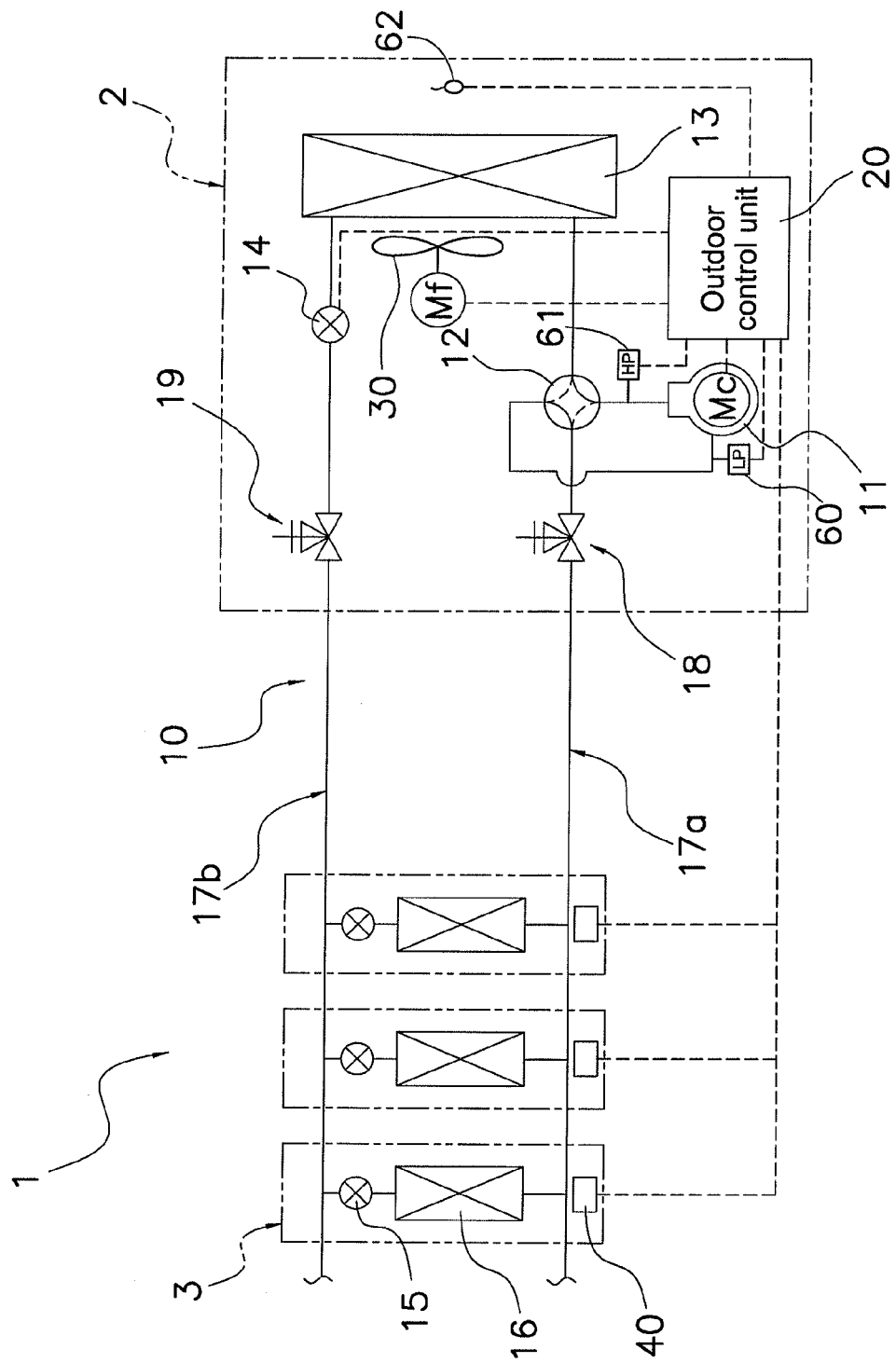
FIG. 1 is a configuration diagram of an air conditioner in accordance with an embodiment of the present invention.

FIG. 1 shows a refrigerant circuit 10 of an air conditioner 1 in accordance with an embodiment of the present invention. The air conditioner 1 is a multiple type air conditioner, having a configuration of a plurality of indoor units 3 connected in parallel to one or a plurality of outdoor units 2. The indoor units 3 are installed inside a building, such as an office building or a general residential building, and the outdoor unit 2 is installed within the property of the general residential building or on a place such as the roof of the office building. The refrigerant circuit 10 of the air conditioner 1 mainly has a compressor 11, a four-way selector valve 12, an outdoor heat exchanger 13, an outdoor expansion valve 14, indoor expansion valves 15, and indoor heat exchangers 16 that are connected to each others in this order, and forms a vapor compression type refrigeration cycle.

The compressor 11, four-way selector valve 12, outdoor heat exchanger 13, and the outdoor expansion valve 14 are included in the outdoor unit 2, and the indoor expansion valves 15 and the indoor heat exchangers 16 are included in the indoor units 3. In addition, a gaseous refrigerant communication pipe 17a connects between the four-way selector valve 12 and the indoor heat exchangers 16, and a liquid refrigerant communication pipe 17b connects between the outdoor expansion valve 14 and the indoor expansion valves 15. The refrigerant communication pipes 17a and 17b are arranged between the outdoor unit 2 and the indoor units 3. In addition, an accumulator and other associated devices are also provided in the outdoor unit 2, but are omitted in the drawing here.

A gas-side shut-off valve 18 and a liquid-side shut-off valve 19 are provided on the terminal portions of the refrigerant circuit inside the outdoor unit 2. The gas-side shut-off valve 18 is disposed on the side of the four-way selector valve 12, and the liquid-side shut-off valve 19 is disposed on the side of the outdoor expansion valve 14. These shut-off valves 18 and 19 are in an opened state after the outdoor unit 2 and the indoor units 3 are installed onsite and the refrigerant communication pipes 17a and 17b are connected to the shut-off valves 18 and 19 respectively.

The refrigerant circuit 10 of the air conditioner 1 shown in FIG. 1 is a simplification of an actual circuit. For example, an actual compressor is often a combination of a variable capacity compressor (hereinafter, inverter compressor) whose operation frequency is controlled by an inverter, and a fixed capacity compressor controlled in an on-off manner, so that it can have various horsepower of 5, 8, 10, 12, 14, 16, 18 horsepower (HP) to correspond to the size of the building in which it will be installed. Furthermore, the compressor 11 in this embodiment is a combination of an inverter compressor 11a and two fixed capacity compressors 11b, 11c (refer to FIG. 2). Furthermore, this inverter compressor 11a is driven by a motor Mc controlled by an inverter 50 (refer to FIG. 2).

In addition, an outdoor fan 30 is arranged in the outdoor unit 2. The outdoor fan 30 rotates so that outside air is drawn inside the casing of the outdoor unit 2, and encourages heat exchange in the outdoor heat exchanger 13 by sending the air that is drawn in to the outdoor heat exchanger 13. The air with heat exchange performed is blown out of the casing of the outdoor unit 2. This outdoor fan 30 is driven by a motor Mf that is controlled by an inverter 51 (refer to FIG. 2).

Various sensors are mounted in the outdoor unit 2 and the indoor units 3. For example, an intake pressure sensor 60 for detecting the pressure Ps on the intake side of the compressor 11, a discharge pressure sensor 61 for detecting the pressure Pd on the discharging side of the compressor 11, and an outside air temperature sensor 62 for detecting the temperature of the outside air (that is, outside air temperature Ta) that flows into the outdoor unit 2 are provided in the outdoor unit 2. It is noted that the pressure Ps of the intake side of the compressor 11 is the pressure of the refrigerant on the low pressure side in the refrigeration cycle that the refrigerant circuit 10 forms, and the pressure Pd on the discharging side of the compressor 11 is the pressure of the refrigerant on the high pressure side in the refrigeration cycle that the refrigerant circuit 10 forms.

Furthermore, an outdoor control unit 20 is provided in the outdoor unit 2, and indoor control units 40 are provided in the indoor units 3. The outdoor control unit 20 is disposed in the interior of an electrical component box (not shown) that is disposed inside the casing of the outdoor unit 2. The outdoor control unit 20 communicates with the indoor control units 40 and also controls electrical equipments 11, 12, 14, 30, and the like that are included in the outdoor unit 2. The indoor control unit 40 communicates with the outdoor control unit 20, and also controls the electrical equipment 15 and the like included in the indoor unit 3. In other words, the control units 20 and 40 form a control section for controlling the overall operation of the air conditioner 1. The indoor control unit 20 is able to communicate with a remote controller (not shown) provided for a user to operate the indoor unit 3.

<Operation of the Air Conditioner>

Next, the operation of this air conditioner 1 will be described.

First, when the system is operated in a cooling mode, the four-way selector valve 12 is held in the state indicated by the solid lines in FIG. 1. High-temperature, high-pressure gaseous refrigerant discharged from the compressor 11 passes through the four-way selector valve 12 and into the outdoor heat exchanger 13, where it is condensed by exchanging heat with the outdoor air. The refrigerant that is condensed and liquefied at the outdoor heat exchanger 13 pass through the fully opened outdoor expansion valve 14 and flows into each of the indoor units 3 via the liquid refrigerant communication pipe 17b. At the indoor units 3, the refrigerant is pressure-reduced by the indoor expansion valves 15 to a prescribed pressure and evaporated in the indoor heat exchanger 16 by exchanging heat with the indoor air. Indoor air cooled by the evaporation of the refrigerant is blown into the indoor area by an indoor fan, not shown, so as to cool the indoor area. After being evaporated in the indoor heat exchanger 16, the gaseous refrigerant returns to the outdoor unit 2 through the gaseous refrigerant communication pipe 17a and is drawn into the compressor 11.

Meanwhile, when the system is operated in heating mode, the four-way selector valve 12 is held in the state indicated by the broken lines in FIG. 1. High-temperature, high-pressure gaseous refrigerant discharged from the compressor 11 passes through the four-way selector valve 12 and into the indoor heat exchangers 16 of each of the indoor units 3, where it is condensed by exchanging heat with the indoor air. Indoor air heated by the condensation of the refrigerant is blown into the indoor area by an indoor fan so as to heat the indoor area. The refrigerant condensed and liquefied in the indoor heat exchangers 16 passes through the fully opened indoor expansion valves 15 and returns to the outdoor unit 2 via the liquid refrigerant communication pipe 17b. The refrigerant returned to the outdoor unit 2 is pressure-reduced by the outdoor expansion valve 14 to a prescribed pressure and evaporated in the outdoor heat exchanger 13 by exchanging heat with the outdoor air. After being evaporated in the outdoor heat exchanger 13, the gaseous refrigerant passes through the four-way selector valve 12 and is drawn into the compressor 11.

During both cooling mode and heating mode, the indoor expansion valves 15 of indoor units 3 that are stopped are closed and hardly any refrigerant is sent to the indoor heat exchangers 16 of those indoor units 3.

<Configuration of the Outdoor Control Unit>

Figure 2:
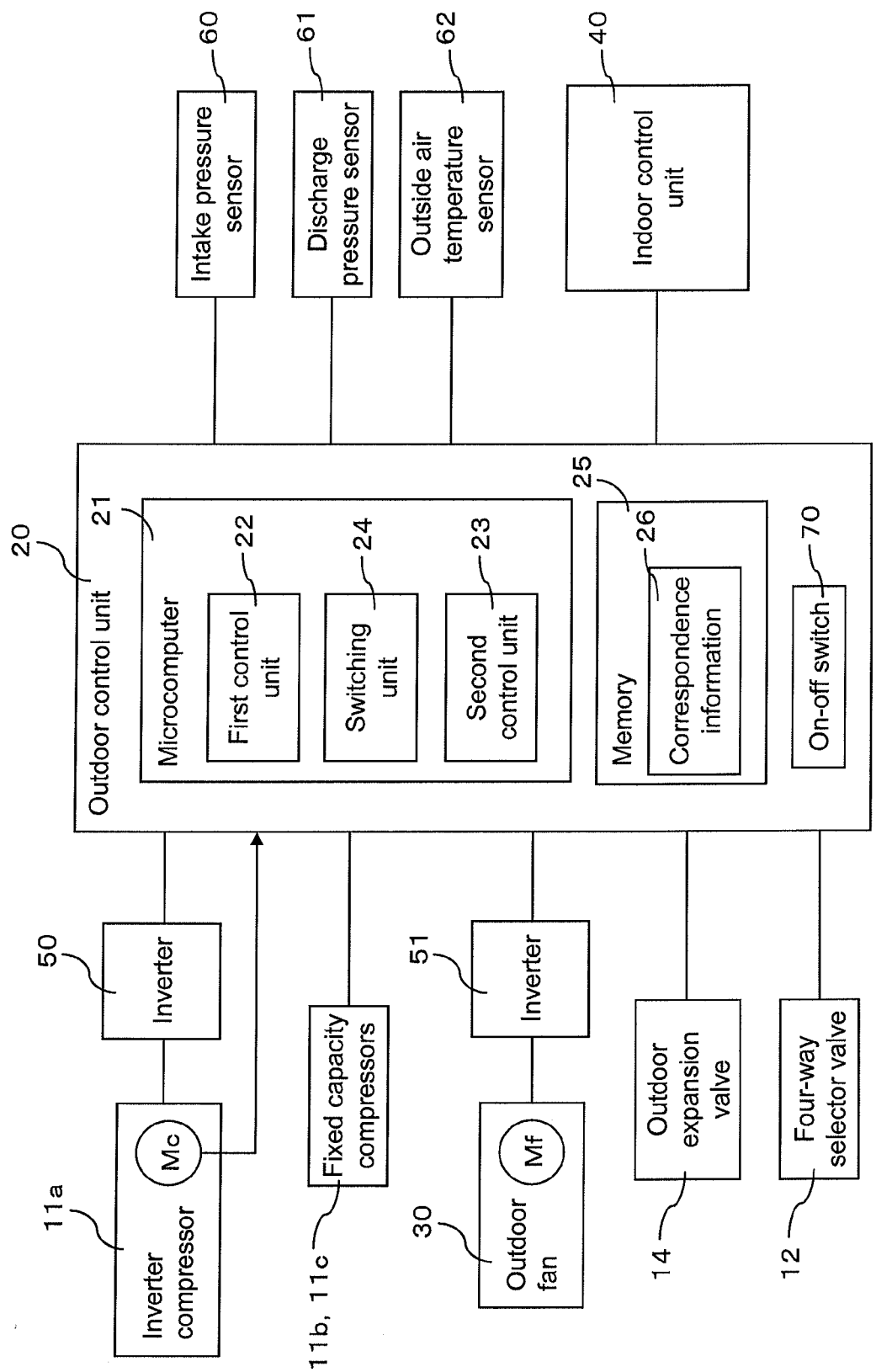
FIG. 2 is a control block diagram of the air conditioner having an outdoor control unit.

The configuration of the outdoor control unit 20 will be described referring to FIG. 2.

The outdoor control unit 20 is a control circuit having a microcomputer 21 and a memory 25, and controls the compressor 11, four-way selector valve 12, outdoor expansion valve 14, outdoor fan 30, and other such various electrical equipments included in the outdoor unit 2, by reading out a program stored in the memory 25 on the microcomputer 21 and executing the program.

The outdoor control unit 20 is connected to various sensors such as the intake pressure sensor 60, discharge pressure sensor 61, and the outside air temperature sensor 62 that are mounted in the outdoor unit 2, and is able to receive information related to the pressure Ps of the intake side of the compressor 11, the pressure Pd of the discharging side of the compressor 11, and the outside air temperature Ta detected by these sensors, and the like. In addition, the outdoor control unit 20 is connected to the indoor control units 40, and is also able to receive the control related information in the indoor units 3. The outdoor control unit 20 controls the various electrical equipments 11, 12, 14, 30, and the like included in the outdoor unit 2 based on these information.

The outdoor control unit 20 controls the inverter compressor 11a by controlling the motor Mc through the inverter 50. At this time, the outdoor control unit 20 performs a PI control of the operation frequency of the inverter compressor 11a while referring to a feed back signal from the motor Mc. In addition, the outdoor control unit 20 also performs the ON and OFF switching of the power of the fixed capacity compressors 11b, 11c.

Furthermore, the outdoor control unit 20 controls the outdoor fan 30 by controlling the motor Mf through the inverter 51. In addition, the inverters 50, 51 are disposed inside the electrical component box (not shown) in which the outdoor control unit 20 is disposed.

When the rotational speed of the outdoor fan 30 is being controlled, the microcomputer 21 operates as a first control unit 22, a second control unit 23, and a switching unit 24 by executing a predetermined program stored in the memory 25 for controlling the rotational speed of the outdoor fan. The first control unit 22 executes a first control, and the second control unit 23 executes a second control. The rotational speed of the outdoor fan 30 is mainly controlled based on the operation frequency of the inverter compressor 11a during the execution of the first control, and mainly controlled based on the pressure Pd of the discharging side of the compressor 11 during the execution of the second control. The switching unit 24 executes a switching control in parallel with the first control or the second control. In this switching control, the switching unit 24 determines whether the rotational speed of the outdoor fan 30 should be controlled by either the first control or the second control, and switches to the first control or the second control according to the determined result.

Furthermore, an on-off switch 70 is provided in the outdoor control unit 20 for allowing a user to select whether to enable or disable the switching control. In the state that this switch is ON, the operation of the switching unit 24 is enabled. Further, in the state that this switch is OFF, the operation of the switching unit 24 is disabled, and the second control is executed by the second control unit 23.

<Control of the Rotation Speed of the Outdoor Fan>

Figure 3:
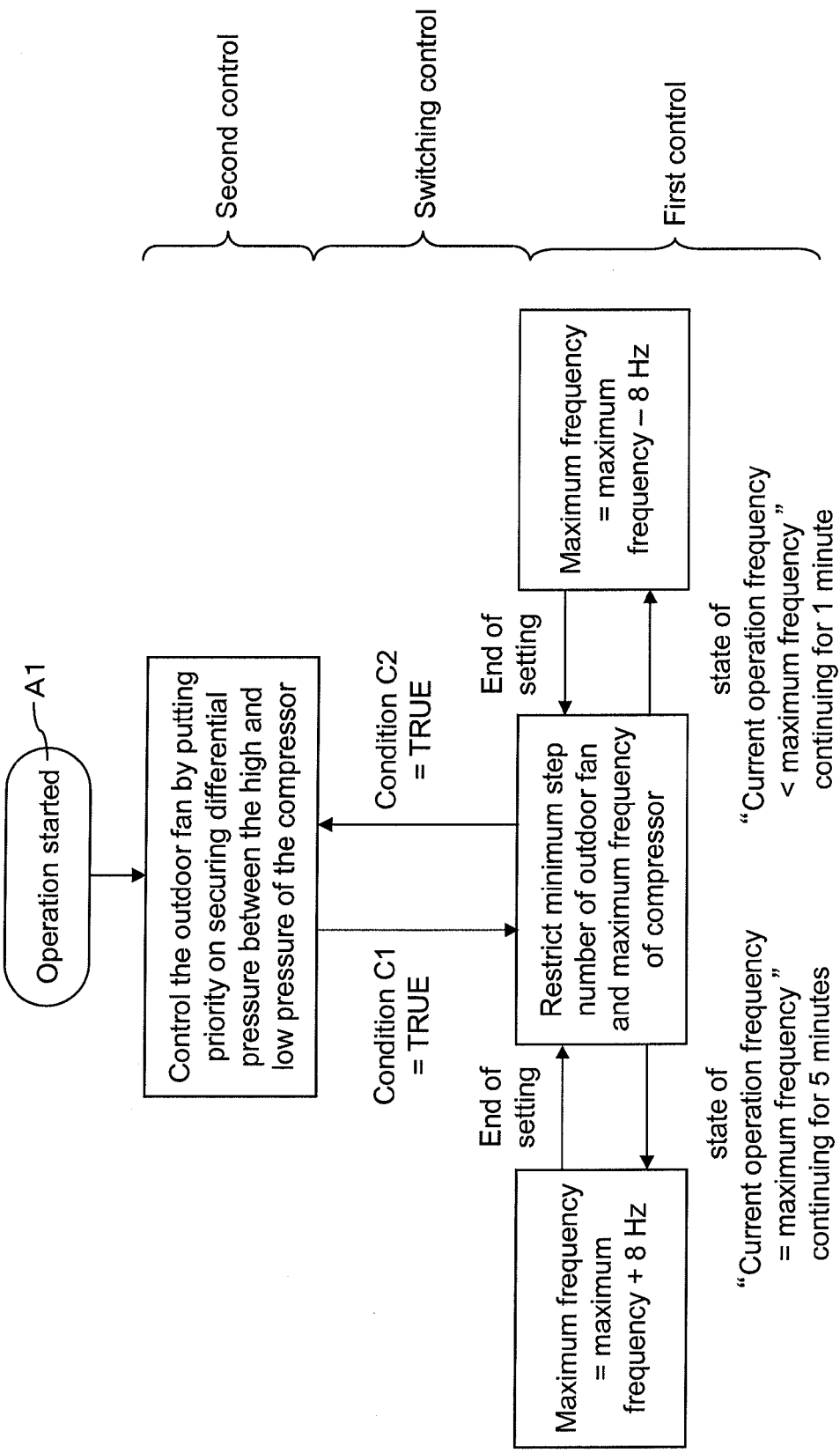
FIG. 3 is a state transition diagram showing control of the rotational speed of an outdoor fan.

The way that the rotational speed of the outdoor fan 30 is controlled will be described in detail below referring to FIG. 3.

First, when at least one of the plurality of indoor units 3 of the air conditioner 1 starts operating (A1), the second control is executed by the second control unit 23.

In the second control, the second control unit 23 controls the rotational speed of the outdoor fan 30 taking into consideration the differential pressure between the high and low pressure of the compressor 11 while referring to the pressure Pd of the discharging side of the compressor 11 detected by the discharge pressure sensor 61. At this time, the rotation of the outdoor fan 30 is controlled in nine stages from step 0 to step 8. The outdoor fan 30 stops in step 0, and the rotational speed thereof increases along with the increase in the step number, and the outdoor fan 30 rotates at a maximum rotational speed in step 8. In the second control, the rotational speed of the outdoor fan 30 is determined with securing the differential pressure between the high and low pressure of the compressor 11 being considered first.

If the on-off switch 70 is on, the switching unit 24 executes a switching control in parallel with the second control performed by the second control unit 23. In the switching control, whether or not a switching condition C1 is fulfilled is determined repeatedly at a predetermined time interval. The switching condition C1 is that the system is operated in cooling mode and the outside air temperature Ta is equal to or below a predetermined temperature (18° C. in this embodiment). If the switching unit 24 determined that the switching condition C1 is met, the switching unit 24 causes the second control unit 23 to terminate the second control, and causes the first control unit 22 to start the first control. However, if the switching unit 24 determined that the switching condition C1 is not met, the switching unit 24 causes the second control unit 23 to continue the second control.

Meanwhile, in the first control, the first control unit 22 controls the rotation of the outdoor fan 30 in nine stages, from step 0 to step 8. At this time, the first control unit 22 sets a maximum frequency for the operation frequency of the inverter compressor 11a. For this reason, during the time that the first control is being executed, while the operation frequency of the inverter compressor 11a is being kept so as not to exceed this maximum frequency, a PI control is performed. In addition, immediately after switching from the second control to the first control, the operation frequency of the inverter compressor 11a at that time is set as the maximum frequency. Furthermore, if a state in which the current operation frequency of the inverter compressor 11a is equal to the maximum frequency continues for a predetermined period of time (5 minutes in this embodiment), the value of the maximum frequency is reset so as to increase for a predetermined amount (8 Hz in this embodiment). By doing so, the operation frequency of the inverter compressor 11a is inhibited from being raised rapidly, and unpleasant feeling resulted from unpleasant operating sound along with the rising of the operation frequency of the inverter compressor 11a is suppressed to a certain degree. Furthermore, during the time that the first control is executed, this maximum frequency is being kept so as not to exceed a predetermined frequency (176 Hz in this embodiment) that is lower than the maximum (210 Hz in this embodiment) of frequencies that the inverter 50 can output. For this reason, during the time that the first control is executed, the operation frequency of the inverter compressor 11a is constantly controlled to be equal to or lower than 176 Hz, and thereby unpleasant noises from the inverter compressor 11a is also suppressed. On the other hand, if a state in which a current operation frequency of the inverter compressor 11a is lower than the maximum frequency continues for a predetermined period of time (1 minute in this embodiment), the value of the maximum frequency is reset so as to decrease for a predetermined amount (8 Hz in this embodiment).

Furthermore, simultaneously with this control, in the first control, the first control unit 22 controls the rotation of the outdoor fan 30 in nine stages from step 0 to step 8, based on a current operation status of the three compressors 11a to 11c. At this time, the first control unit 22 determines the step number of the rotation of the outdoor fan 30 while referring to correspondence information 26 shown in FIG. 4 that is stored in the memory 25.

In the correspondence information 26, the minimum values of the step number of the rotation of the outdoor fan 30 are set, corresponding to whether or not the two fixed capacity compressors 11b, 11c are driven, and the operation frequency of the inverter compressor 11a. That is, during the time that the first control is being executed, the outdoor fan 30 rotates at a step number equal to or greater than the minimum value set in the corresponding information 26. For this reason, even if the system is operated in the cooling mode under a low outside air condition in which the outside air temperature is lower than 18° C., the rotational amount of the outdoor fan 30 is secured minimally. Therefore, unpleasant operating sound when the operation frequency of the inverter compressor 11a is rising is drowned out by the rotating sound of the outdoor fan 30. In other words, during the time that the first control is being executed, the rotation of the outdoor fan 30 is being encouraged in order to drown out the unpleasant operating sound of the compressor 11, but the differential pressure between the high and low pressure of the compressor 11 is not secured as sufficiently compared to if the second control is executed.

In addition, during the time that this kind of a first control is being executed, a switching control is also executed by the switching unit 24. In the switching control during the first control, whether or not a switching condition C2 is fulfilled is determined repeatedly at a predetermined time interval. The switching condition C2 is that the outside air temperature Ta is equal to or below a predetermined temperature (6° C. in this embodiment), the differential pressure between the high and low pressure of the compressor 11 is below a predetermined standard value, a state of the outdoor fan 30 rotating on or above step 7 continues for a predetermined period of time (3 minutes in this embodiment), or the on-off switch 70 is switched to off (switching condition C2). Furthermore, the switching unit 24 makes the first control unit 22 terminate the first control, and makes the second control unit 23 start the second control when it is determined that the switching condition C2 is met. On the other hand, the switching unit 24 makes the first control unit 22 continue the first control if it is determined that the switching condition C2 is not met.

In other words, in the switching control during the first control, if the outside air temperature Ta is equal to or below 6° C., since it is difficult to secure the differential pressure between the high and low pressure of the compressor 11, it is switched to the second control in which securing the differential pressure between the high and low pressure of the compressor 11 is given priority. In addition, if the differential pressure between the high and low pressure of the compressor 11 is below a predetermined standard value, it is also switched to the second control in which securing the differential pressure between the high and low pressure of the compressor 11 is given priority. If the outdoor fan 30 rotates in step 7 or step 8, the outside air temperature Ta is expected to be above 18° C. Therefore, if this kind of a state continues for three minutes, it is also switched to the second control. Furthermore, since the first control is a control that is executed only in the case that a user wants to use the first control together with the second control, that is, in the case that the on-off switch 70 is on, even in the case that the on-off switch 70 is switched from on to off during the time that the first control is executed, it is forced to switch to the second control.

<Characteristics>

(1)

In the above described embodiment, the rotational speed of the outdoor fan 30 is controlled by using two types of controls of the first control and the second control. The first control and the second control are not executed at the same time, but one of them is selected by the switching unit 24. Furthermore, in the first control, the rotation of the outdoor fan 30 is kept at a step number that is on or above a minimum value set in accordance with the operation status of the compressor 11. By doing so, the rotational amount of the outdoor fan 30 is kept minimally, and thereby unpleasant operating sound at the time that the operation frequency of the inverter compressor 11a is rising can be drowned out by the rotating sound of the outdoor fan 30.

(2)

In the above described embodiment, a user is able to select whether to enable or disable the switching control for using the first control and the second control in combination, through the on-off switch 70.

MODIFICATION EXAMPLES (1)

In the above described embodiment, even though the rotational speed of the outdoor fan 30 is controlled based on the pressure Pd of the discharging side of the compressor 11 in the second control, it may be controlled based on some other parameter. For example, the temperature of the refrigerant that flows through inside the outdoor heat exchanger 13 can be adopted as another parameter. Also in this case, it is possible for the securing of the differential pressure between the high and low pressure of the compressor 11 to be considered first, since the temperature (condensation temperature during the time that the system is operated in the cooling mode) of the refrigerant that flows through inside the outdoor heat exchanger 13 is a value according to the pressure Pd on the discharging side of the compressor 11.

(2)

In the above described embodiment, even though the on-off switch 70 for receiving a selection to enable or disable the switching control is provided in the outdoor control unit 20, this kind of a switch may be provided in a remote controller that is provided for a user to operate an indoor unit 3.

INDUSTRIAL APPLICABILITY

The present invention has an effect of being able to reduce an unpleasant feeling that is resulted from an operating sound of a compressor when the operation frequency thereof is rising, in an air conditioner. The present invention is useful as a rotation speed control device for controlling the rotational speed of an outdoor fan, an air conditioner including a rotation speed control unit for controlling the rotational speed of an outdoor fan, and a rotation speed control method for controlling the rotation speed of an outdoor fan.

What is claimed is:

1. A rotation speed control device for controlling a rotational speed of an outdoor fan that is arranged to send air to an outdoor heat exchanger of a refrigerant circuit in order to enhance heat exchange at the outdoor heat exchanger, the rotation speed control device comprising:
  a first control unit configured to execute a first control in order to control the rotational speed of the outdoor fan based on an operation frequency of a compressor of the refrigerant circuit;
  a second control unit configured to execute a second control in order to control the rotational speed of the outdoor fan based on a parameter other than the operation frequency in order to obtain a differential pressure between the high and low pressure of a compressor; and
  a switching unit configured to execute a switching control in which said switching control switches
    to the first control from the second control if a first switching condition is met while the second control is being executed, and
    to the second control from the first control if a second switching condition is met while the first control is being executed,
  said first switching condition including a first outside-air-temperature condition where the outside air temperature is lower than a first temperature when operating in a cooling mode, and
  said second switching condition including a condition where the differential pressure between the high and low pressure of the compressor is below a predetermined standard value.

2. The rotation speed control device according to claim 1, wherein
  the parameter is pressure of a discharge side of the compressor or temperature of the outdoor heat exchanger.

3. The rotation speed control device according to claim 2, wherein
  the switching unit is configured to switch from the first control to the second control if differential pressure between high and low pressure of the compressor is below a predetermined standard value when the first control is executed.

4. The rotation speed control device according to claim 1, further comprising
  a memory unit configured to store correspondence information correlating the operation frequency and the rotational speed, and
  the first control unit is configured to refer to the correspondence information stored in the memory unit in order to control the rotational speed when the first control is executed.

5. The rotation speed control device according to claim 4, wherein
the correspondence information includes information to set a minimum value of the rotational speed in relation to the operation frequency.

6. The rotation speed control device according to claim 1, further comprising
a selection receiving unit configured to receive a selection in order to selectively enable or disable the switching control.

7. A rotation speed control device for controlling a rotational speed of an outdoor fan that is arranged to send air to an outdoor heat exchanger of a refrigerant circuit in order to enhance heat exchange at the outdoor heat exchanger, the rotation speed control device comprising:
a first control unit configured to execute a first control in order to control the rotational speed of the outdoor fan based on an operation frequency of a compressor of the refrigerant circuit;
a second control unit configured to execute a second control in order to control the rotational speed of the outdoor fan based on a parameter other than the operation frequency, the parameter being pressure of a discharge side of the compressor or temperature of the outdoor heat exchanger; and
a switching unit configured to execute a switching control in order to switch between the first control and the second control in accordance with a predetermined switching condition when a cooling mode is being operated and when outside air temperature is lower than a first temperature,
the switching unit being further configured to switch from the first control to the second control if the outside air temperature is below a second temperature that is lower than the first temperature when the first control is being executed.

8. The rotation speed control device according to claim 7, wherein
the switching unit is further configured to switch from the first control to the second control if differential pressure between high and low pressure of the compressor is below a predetermined standard value when the first control is executed.

9. The rotation speed control device according to claim 8, further comprising
a memory unit configured to store correspondence information correlating the operation frequency and the rotational speed, and
the first control unit is configured to refer to the correspondence information stored in the memory unit in order to control the rotational speed when the first control is executed.

10. The rotation speed control device according to claim 9, wherein
the correspondence information includes information to set a minimum value of the rotational speed in relation to the operation frequency.

11. The rotation speed control device according to claim 10, further comprising
a selection receiving unit configured to receive a selection in order to selectively enable or disable the switching control.

12. The rotation speed control device according to claim 11, wherein
the second control is executed and the first control is not executed if a selection is received by the selecting receiving unit to disable the switching control.

13. The rotation speed control device according to claim 7, further comprising
a memory unit configured to store correspondence information correlating the operation frequency and the rotational speed, and
the first control unit is configured to refer to the correspondence information stored in the memory unit in order to control the rotational speed when the first control is executed.

14. The rotation speed control device according to claim 13, wherein
the correspondence information includes information to set a minimum value of the rotational speed in relation to the operation frequency.

15. The rotation speed control device according to claim 14, further comprising
a selection receiving unit configured to receive a selection in order to selectively enable or disable the switching control.

16. The rotation speed control device according to claim 15, wherein
the second control is executed and the first control is not executed if a selection is received by the selecting receiving unit to disable the switching control.

17. A rotation speed control device for controlling a rotational speed of an outdoor fan that is arranged to send air to an outdoor heat exchanger of a refrigerant circuit in order to enhance heat exchange at the outdoor heat exchanger, the rotation speed control device comprising:
a first control unit configured to execute a first control in order to control the rotational speed of the outdoor fan based on an operation frequency of a compressor of the refrigerant circuit;
a second control unit configured to execute a second control in order to control the rotational speed of the outdoor fan based on a parameter other than the operation frequency;
a switching unit configured to execute a switching control in order to switch between the first control and the second control in accordance with a predetermined switching condition when a cooling mode is being operated and when outside air temperature is lower than a first temperature; and
a selection receiving unit configured to receive a selection in order to selectively enable or disable the switching control,
the second control being executed and the first control not being executed if a selection is received by the selection receiving unit to disable the switching control.

18. An air conditioner, comprising:
a refrigerant circuit having a compressor, an outdoor heat exchanger, expansion valves, and an indoor heat exchanger;
an outdoor fan arranged to send air to the outdoor heat exchanger in order to enhance heat exchange at the outdoor heat exchanger; and
a rotation speed control unit configured to control a rotational speed of the outdoor fan, the rotation speed control unit including
a first control unit configured to execute a first control in order to control the rotational speed based on an operation frequency of the compressor,
a second control unit configured to execute a second control in order to control the rotational speed based on a parameter other than the operation frequency in order to obtain a differential pressure between the high and low pressure of a compressor, and a switching unit configured to execute a switching control in which said switching control switches to the first control from the second control if a first switching condition is met while the second control is being executed, and to the second control from the first control if a second switching condition is met while the first control is being executed, said first switching condition including a first outside-air-temperature condition where the outside air temperature is lower than a first temperature when operating in a cooling mode, and said second switching condition including a condition where the differential pressure between the high and low pressure of the compressor is below a predetermined standard value.

19. A rotation speed control method for controlling a rotational speed of an outdoor fan arranged to send air to an outdoor heat exchanger of a refrigerant circuit in order to enhance heat exchange at the outdoor heat exchanger, the rotation speed control method comprising:

controlling the rotational speed based on an operation frequency of a compressor of the refrigerant circuit when a first control is executed;

controlling the rotational speed based on a parameter other than the operation frequency when a second control is executed in order to obtain a differential pressure between the high and low pressure of a compressor; and switching to the first control from the second control if a first switching condition is met while the second control is being executed, and to the second control from the first control if a second switching condition is met while the first control is being executed, said first switching condition including a first outside-air-temperature condition where the outside air temperature is lower than a first temperature when operating in a cooling mode, and said second switching condition including a condition where the differential pressure between the high and low pressure of the compressor is below a predetermined standard value.

* * * * *